United States Patent
Baughman et al.

(10) Patent No.: US 10,417,568 B2
(45) Date of Patent: Sep. 17, 2019

(54) DISCOVERING COGNITION BIAS TOWARD DATA PRESENTATION STYLES THROUGH FILE SYSTEM ANALYSIS

(71) Applicant: INTERNATIONAL BUSINESS MACHINES CORPORATION, Armonk, NY (US)

(72) Inventors: Aaron K. Baughman, Silver Spring, MD (US); James R. Kozloski, New Fairfield, CT (US); Timothy M. Lynar, Kew (AU); Suraj Pandey, Parkville (AU); John M. Wagner, Plainville, CT (US)

(73) Assignee: International Business Machines Corporation, Armonk, NY (US)

(*) Notice: Subject to any disclaimer, the term of this patent is extended or adjusted under 35 U.S.C. 154(b) by 723 days.

(21) Appl. No.: 14/285,121

(22) Filed: May 22, 2014

(65) Prior Publication Data

US 2015/0339584 A1 Nov. 26, 2015

(51) Int. Cl.
*G06N 5/02* (2006.01)
*G06N 5/04* (2006.01)
*G06F 16/11* (2019.01)
*G06F 16/26* (2019.01)

(52) U.S. Cl.
CPC .......... *G06N 5/048* (2013.01); *G06F 16/116* (2019.01); *G06F 16/26* (2019.01); *G06N 5/02* (2013.01)

(58) Field of Classification Search
None
See application file for complete search history.

(56) References Cited

U.S. PATENT DOCUMENTS

| | | | | |
|---|---|---|---|---|
| 5,615,301 A | * | 3/1997 | Rivers | G06F 17/2872 704/2 |
| 7,287,012 B2 | * | 10/2007 | Corston | G06F 17/30687 706/12 |
| 2006/0117067 A1 | | 6/2006 | Wright et al. | |

FOREIGN PATENT DOCUMENTS

| | | |
|---|---|---|
| WO | 0038134 A1 | 6/2000 |
| WO | 02052374 A2 | 7/2002 |
| WO | 2009032254 A2 | 3/2009 |

OTHER PUBLICATIONS

Kuncheva, How Good Are Fuzzy If-Then Classifiers?, IEEE Transactions on Systems, Man, and Cybernetics—Part B: Cybernetics, vol. 30, No. 4, Aug. 2000, pp. 501-509.*

(Continued)

*Primary Examiner* — Wilbert L Starks
(74) *Attorney, Agent, or Firm* — Law Office of Jim Boice

(57) ABSTRACT

A method, system, and/or computer program product establish a data organization format for displaying data to a specific user. A first set of data, which is organized according to a user-selected data organization format, is received from a user. A cognition bias, which defines a preferred manner in which the user cognitively interprets data, is identified by being associated with the user-selected data organization format. The cognition bias is also associated with one or more other data organization formats that support the cognition bias. A second set of data is received and formatted using the one or more other data organization formats that also support the cognition bias. The second set of data is then displayed using the one or more data organization formats that also support the cognition bias.

20 Claims, 7 Drawing Sheets

(56) References Cited

OTHER PUBLICATIONS

Azmi, A Driver Fatigue Monitoring and Haptic Jacket-Based Warning System, Master's Thesis, Ottawa-Carleton Institute for Electrical and Computer Engineering, 2012, pp. 1-91.*
Kuncheva, How Good Are Fuzzy If-Then Classifiers?, IEEE Transactions on Systems, Man, and Cybernetics—Part B: Cybernetics, vol. 30, No. 4, Aug. 2000, pp. 501-509 (Year: 2000).*
Azmi, A Driver Fatigue Monitoring and Haptic Jacket-Based Warning System, Master's Thesis, Ottawa-Carleton Institute for Electrical and Computer Engineering, 2012, pp. 1-91. (Year: 2012).*
Y. Lu et al., "Personalization in Multimedia Retrieval: A Survey", Springer Link, Multimedia Tools and Applications, Jan. 2011, vol. 51, Issue 1, pp. 247-277 (Abstract Only).
R.A. Pfister, "Does the Medium Matter? An Experiment on the Impact of Collaboration on Visual Sales Sessions", IEEE, 16th International Conference on Information Visualisation, 2012, pp. 343-348 (Abstract Only).
S. Duan et al., "One Size Does Not Fit All: Customizing Ontology Alighment Using User Feedback", Springer, The Semantic Web—ISWC 2010, Lecture Notes in Computer Science vol. 6496, 2010, pp. 177-192.

\* cited by examiner

FIG. 4

Table 400:

| DATA DISPLAY FORMAT 402 | | | | | COGNITION BIASES 404 | | | |
|---|---|---|---|---|---|---|---|---|
| TREE FORMAT | SEARCHABLE CLOUD FORMAT | DATABASE FORMAT | KOHONEN MAP FORMAT | ORGANIZATIONAL CHART FORMAT | HIERARCHICAL | VISUAL | SPARSE | |
| HIERARCHICAL | TEXTUAL | DETAILED | VISUAL | HIERARCHICAL | | | | |
| VISUAL | DETAILED | RELATIONAL | SPARSE | VISUAL | | | | |
| SPARSE | NON-RELATIONAL | TEXTUAL | RELATIONAL | SPARSE | | | | |

FIG. 5

Table 500:

| COGNITION BIASES 404 | | | | | DATA DISPLAY FORMAT 402 | | | |
|---|---|---|---|---|---|---|---|---|
| HIERARCHICAL | TEXTUAL | DETAILED | VISUAL | RELATIONAL | SPARSE | NON-RELATIONAL | | |
| TREE | SEARCHABLE CLOUD | DATABASE | KOHONEN MAP | DATABASE | KOHONEN MAP | SEARCHABLE CLOUD | | |
| ORGANIZATIONAL CHART | DATABASE | SEARCHABLE CLOUD | TREE | KOHONEN MAP | TREE | | | |
| | | ORGANIZATIONAL CHART | ORGANIZATIONAL CHART | | ORGANIZATIONAL CHART | | | |

DISCOVERING COGNITION BIAS TOWARD DATA PRESENTATION STYLES THROUGH FILE SYSTEM ANALYSIS

BACKGROUND

The present disclosure relates to the field of computers, and specifically to the use of computers in presenting data. Still more particularly, the present disclosure relates to analyzing user-selected formats for presenting data, in order to identify a cognition bias that applies to the user.

Data can be presented on a screen in various formats. For example, a set of data may be represented as a hierarchical tree, while the same set of data may be represented as a cloud of data, on a data map, or even hidden. In order to access the data from this set of data, different tools may need to be provided. That is, while a hierarchical tree presents all of the data in an organized manner, accessing cloud and/or hidden data may require the use of a "search" function. However the data is presented, the same information is accessible in one form or another.

SUMMARY

A method, system, and/or computer program product establish a data organization format for displaying data to a specific user. A first set of data, which is organized according to a user-selected data organization format, is received from a user. A cognition bias, which defines a preferred manner in which the user cognitively interprets data, is identified by being associated with the user-selected data organization format. The cognition bias is also associated with one or more other data organization formats that support the cognition bias. A second set of data is received and formatted using the one or more other data organization formats that also support the cognition bias. The second set of data is then displayed using the one or more data organization formats that also support the cognition bias.

BRIEF DESCRIPTION OF THE SEVERAL VIEWS OF THE DRAWINGS

FIG. 4 depicts an exemplary lookup table for matching a data organization and subsequent display format to one or more cognition biases;

FIG. 5 illustrates an exemplary lookup table for matching a cognition bias to one or more data organization and subsequent display formats;

DETAILED DESCRIPTION

Figure 1:
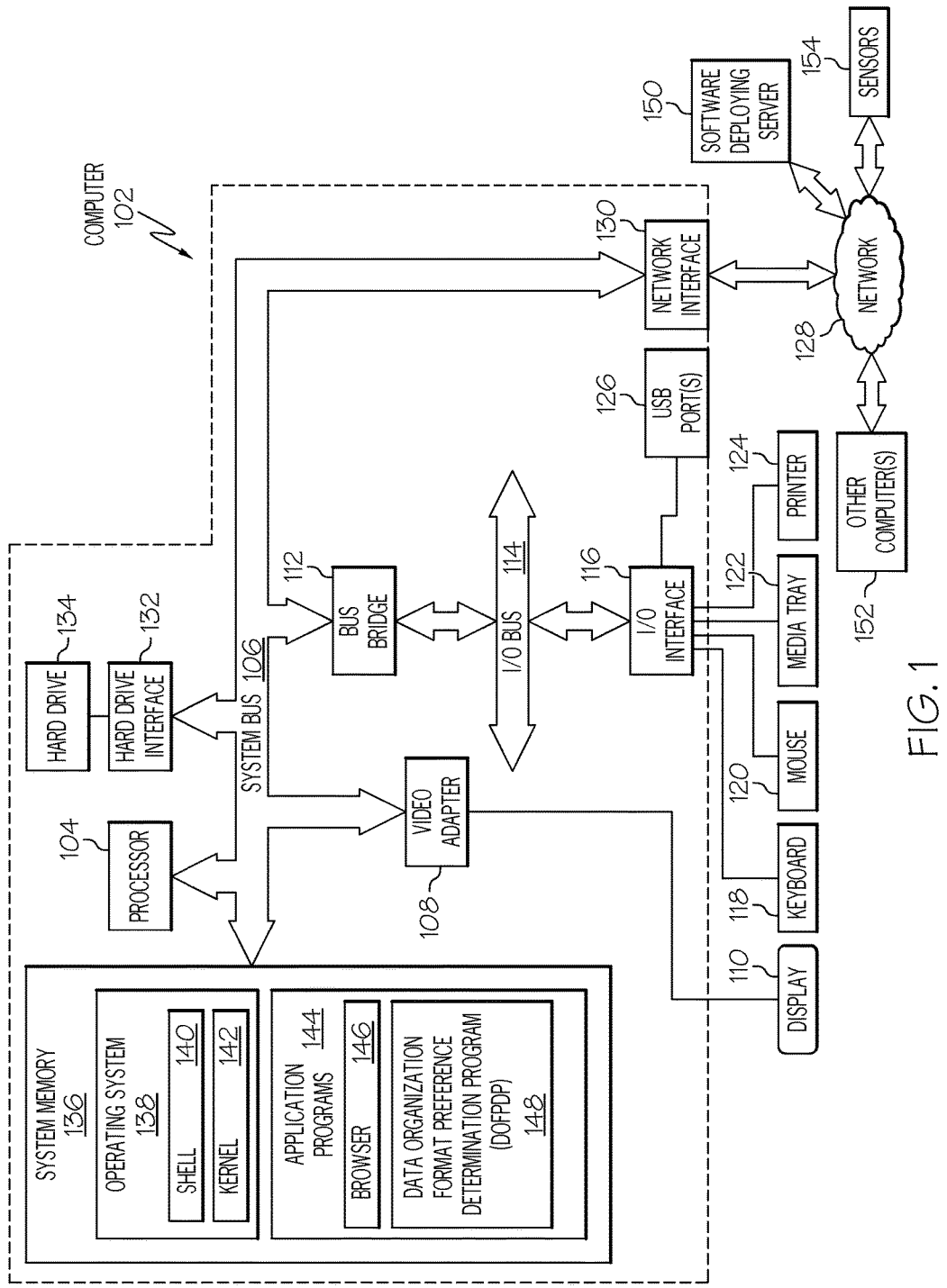
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Data Organization Format Preference Determination Program (DOFPDP) 148. DOFPDP 148 includes code for implementing the processes described below, including those described in FIGS. 2-8. In one embodiment, computer 102 is able to download DOFPDP 148 from software deploying server 150, including in an on-demand basis, wherein the code in DOFPDP 148 is not downloaded until needed for execution. Note further that, in one embodiment of the present invention, software deploying server 150 performs all of the functions associated with the present invention (including execution of DOFPDP 148), thus freeing computer 102 from having to use its own internal computing resources to execute DOFPDP 148.

Also coupled to computer 102 are, in one embodiment, are sensors 154. Sensors 154, according to one or more embodiments, are physiological sensors (e.g., electrocardiogram sensors, electroencephalogram sensors, blood pressure sensors, etc.), mechanical sensors (e.g., thermometers, pressure gauges, etc. on mechanical systems), position sensors (e.g., GPS tracking devices), weather sensors (e.g., barometers, weather radar, thermometers, etc.)

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
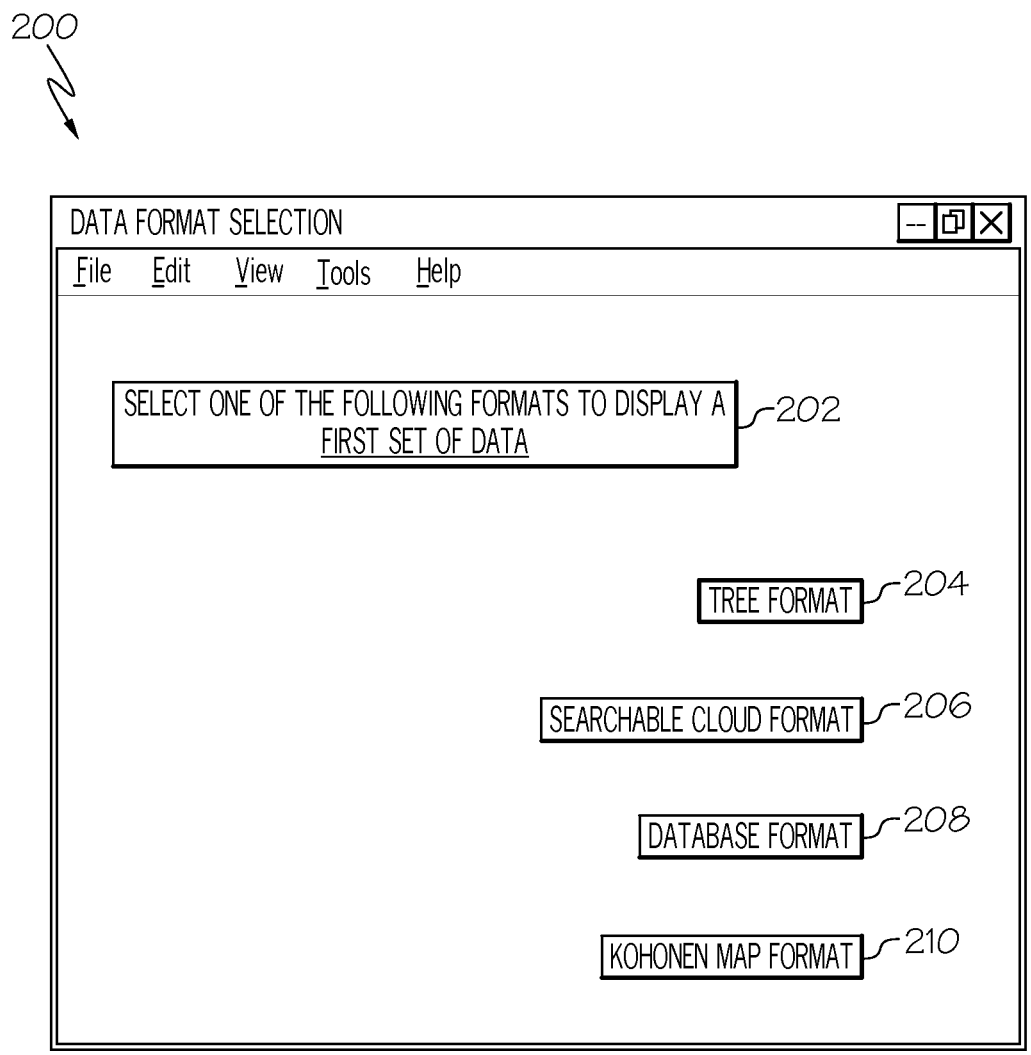
FIG. 2 illustrates an exemplary data display format selection Graphical User Interface (GUI) for selecting a data display format in which a first set of data is to be presented.

With reference now to FIG. 2, exemplary data display format selection Graphical User Interface (GUI) 200 is utilized by a user to select a data display format in which a first set of data is to be presented. This first set of data may be a set of folders/files in a database; a set of video images (still pictures or moving videos); a set of medical records; a set of academic publications; a set of webpages; a set of real-time traffic data received from real-time radar/transponder (unique identifier) systems; a set of data from computer sensors (e.g., CPU usage, system temperature, memory availability, etc.); a set of data generated by the sensors 154 depicted in FIG. 1; etc.

Thus, as depicted in field 202 of FIG. 2, a user is presented with instructions to display the first set of data according to one of the options shown in data display format selection GUI 200.

For example, a user may click button 204, thus causing the first set of data to be presented in a tree format, in which a hierarchical nature of the data is represented by nodes/connectors going from a root node down to various branches and end nodes (leaves). Typically, such tree graphs provide limited detail about each piece of data (i.e., node).

Alternatively, the user may click button 206, indicating a preference for the data being depicted as a searchable cloud. In this format, the data itself may or may not be initially visible. That is, the data may be presented on a screen, or it may be initially hidden from view. In either embodiment, the data is searchable. For example, the user may enter a key term on a GUI, which results in all data that contains and/or is related to that key term to be retrieved. This allows the user to retrieve extensive detail about each piece of data.

Alternatively, the user may click button 208, indicating a preference for the data to be depicted in a database format, in which data is sorted according to fields, with their relationships being depicted. For example, this data display format may use a spreadsheet, in which data is sorted into columns and rows of cells, and in which data from one cell may be dependent on data from another cell. Depending on the structure of the database, the amount of detail available for each piece of datum ranges from limited (i.e., just a name) to extensive (i.e., voluminous detail about the traits of each piece of data).

Alternatively, the user may click button 210, indicating a preference for the data to be depicted in a map, and more particularly a Kohonen Map. A Kohonen Map, also known as a Self Organizing feature Map (SOM), represents multi-dimensional data nodes onto one or two dimensions by reducing the vectors in the multidimensional data. The relationships between the data nodes define the topology (i.e., elevations and depressions) of the SOM, allowing the user to view relationships between data, but with only limited detail about the data nodes themselves.

Figure 3:
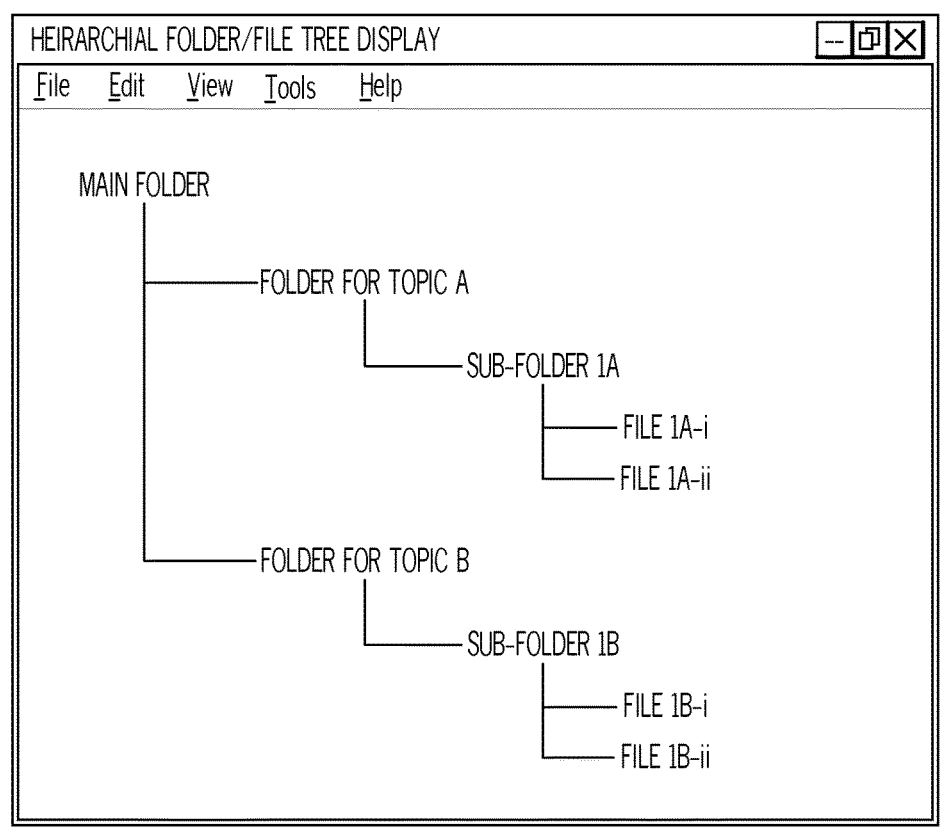
FIG. 3 illustrates an exemplary first GUI on which a first set of data has been arranged according to a user-selected format.

With reference now to FIG. 3, assume that a user selected button 204 in data display format selection GUI 300 in FIG. 3. This resulted in the first set of data being depicted as a hierarchical tree data graph, which includes a root main folder, second tier folders, sub-folders, and finally files found within the sub-folders. Note that while there is little detail about the data, this view give the user the ability to "get the big picture" of how data within the first set of data are related to one another. From this user selection, the present invention is able to discern a cognition bias of the user. The term "cognition bias" is defined as a heuristic preference of a user for mentally processing information.

For example, consider lookup table 400 in FIG. 4. Lookup table 400 depicts an exemplary lookup table for matching a data display format 402 to one or more cognition biases 404. In one embodiment, the cognition biases are weighted, such that a cognition bias shown higher in a column below a particular data display format is better fulfilled than a cognition bias that is shown lower in that column. That is, a "tree" data display format is an excellent data display format to use for persons who think in a "hierarchical" manner. The "tree" data display format is also a good choice for persons who tend to be more "visual", but is still a better fit for those persons who think "hierarchically".

With reference to the cognition biases 404, various cognition biases are presented. A high-level meaning of each of these cognition biases is now presented.

A "hierarchical" cognition bias describes a person who processes information in a "hierarchical" manner, where data is understood according to its relationship to other data, particularly dependency relationships. For example, one datum may be a subunit of another datum, which datum is dependent on another datum, etc. Thus, it is the organization, relationships, and dependencies between data that allows this person to intuitively understand the set of data, its meaning, etc. This understanding, however, is at the expense of any extensive information about the data itself (as illustrated in FIG. 3).

A "textual" cognition bias describes a person who best understands data by recognizing 1) the data itself (e.g., a title) and/or 2) metadata about that data (e.g., the origin of the title, when it was created, etc.). This type of person prefers to understand the details/meaning of the data, with little regard to how the data relates to other data.

A "detailed" cognition bias is similar to a "textual" cognition bias, in that it describes a person who understands data better as the amount of detail (e.g., metadata) increases. That is, this type of person prefers to know extensive detail about the data, in order to understand the data itself. Unlike the "textual" bias, however, the data itself may be in the form of numbers, colors, videos, sounds, etc., rather than just words.

A "visual" cognition bias describes a person who is visually oriented, and thus prefers data that is presented in a visual format, such as a pie chart, a Kohonen map, etc. Persons with a "visual" cognition bias are thus less concerned with details about the data, and are more concerned with the "big picture" about the data.

A "relational" cognition bias describes a person who is interested in how data are related to one another. Persons with a "relational" cognition bias are thus more concerned with how data interacts and/or is related (although not necessarily hierarchically) than other aspects of the data.

A "non-relational" cognition bias describes a person who is uninterested in how data are related to one another. That is, persons with a "non-relational" cognition bias approach each piece of data as a standalone unit, which is to be judged/evaluated/understood on its own.

A "sparse" cognition bias describes a person who is uninterested in details about the data, and prefers only to see large groups (i.e., headings, parameters, types) of data.

These types of cognition bias are presented for exemplary purposes only, and are not to be construed as limiting the scope of the present invention.

Returning now to FIG. 4, consider the data display format "tree" (which was used in FIG. 3). Lookup table 400 in FIG. 4, which has been created based on studies of how persons process information and how they respond to data being presented in various formats, indicates that those persons who have cognition biases of "hierarchical", "visual", and/or "sparse" are most comfortable understanding and interpreting data that is presented in a data display "tree" format. The other data display formats likewise show (in order of preference) different cognition biases 404 that are associated with (i.e., prefer) a particular data display format from the data display formats 402. Note that all of the data display formats presented as options in FIG. 2 may or may not be included in lookup table 400. Likewise, data display formats other than those presented in data display format selection GUI 200 (i.e., elements 204, 206, 208, 210) may appear in lookup table 400. For example, "organizational chart format" is not a format that is offered to the user in data display format selection GUI 200, and yet it appears in the lookup table 400.

Once the lookup table 400 in FIG. 4 is constructed, various cognition biases 404 are then associated with the various data display formats 402 in a lookup table 500, as depicted in FIG. 5. That is, if a person has a cognition bias as being "hierarchical", then that person will best respond to (i.e., be able to interpret, understand, analyze, etc.) data that is presented in a "tree" data display format. This person will also respond well to data that is displayed in an "organizational chart" data display format. While in one embodiment, the initial preference of the person is for all data to be presented in the "tree" data display format (as indicated by "tree" being at the top of the column below the "hierarchical" cell), the system will understand that this preference may be outweighed by the type of data. That is, lookup table 500 reveals that both "tree" and "organizational chart" are acceptable formats for a person having a "hierarchical" cognition bias. However, the system (e.g., computer 102 shown in FIG. 1) may heavily weigh using the "organizational chart" over a "tree" when presenting data about members of an enterprise. Thus, since "organizational chart" is acceptable for a person having a "hierarchical" cognition bias, then the system will elect to present future sets of data related to members of an enterprise as an "organizational chart". Similarly, data related to a particular project (e.g., creating a cinema film) may be appropriately presented in an "organizational chart" manner.

Figure 6:
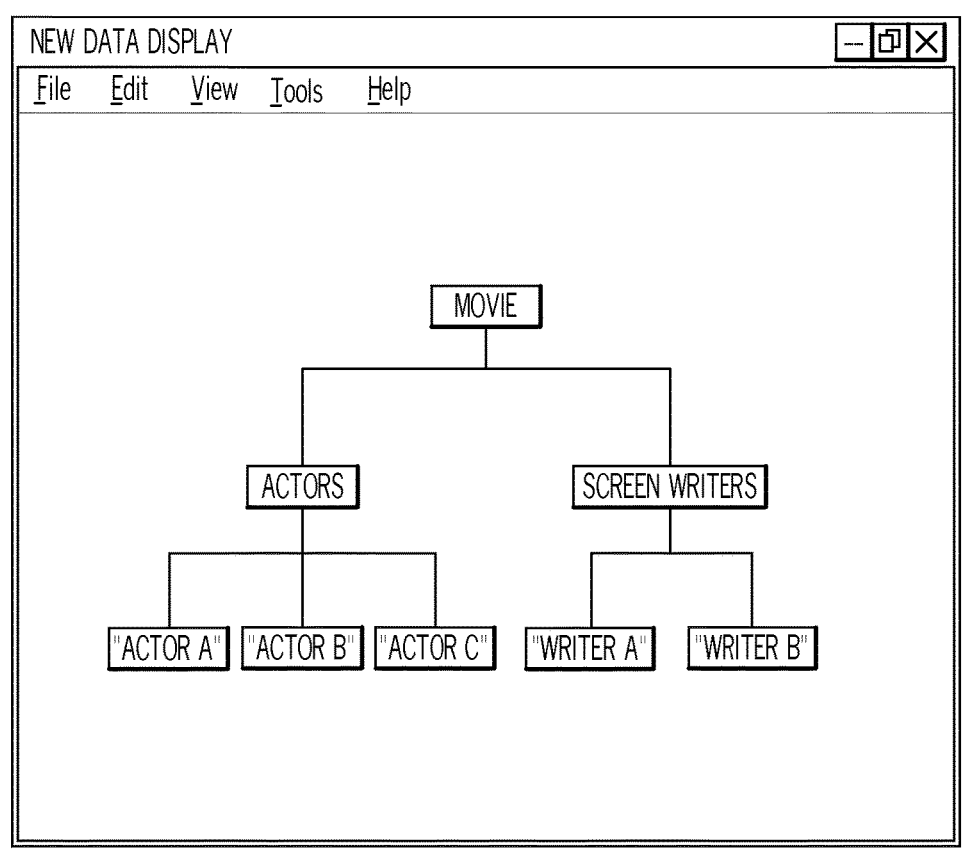
FIG. 6 depicts an exemplary second GUI on which a second set of data is arranged according to a data organization format that comports with a cognition bias in which the first GUI in FIG. 3 was in compliance.

Thus, FIG. 6 depicts an exemplary second GUI 600 on which a second set of data is arranged according to a data display format that comports with a cognition bias in which the first GUI 300 in FIG. 3 was in compliance. That is, GUI 300 utilized the user-selected data display format of "tree" that was selected by the user in FIG. 2. This selection of a preferred data display format by the user allows the system to understand that this user has a cognition bias of "hierarchical", "visual", and/or "sparse" (from lookup table 400 in FIG. 4). If the system selected the "hierarchical" cognition bias for this user, then the system now understands from lookup table 500 in FIG. 5 that this particular user will be comfortable with either a "tree" data display format or a "organizational chart" data display format. However, if the system has its own bias of presenting information about projects as an "organizational chart", then the second GUI 600 will use the "organizational chart" data display format to display the second set of data. If the system has elected to define this particular user's cognition bias as "visual" or "sparse", then one of the data display formats under these headings would be used to display the second set of data.

Note that the user's cognition bias overrides any bias/preference that the system may have if the system's bias/preference is not found under the cognition bias heading for that user. That is, if the system has determined, based on the user's initial selection of a "tree" format in FIG. 2, that this user has a "hierarchical", "visual", and/or "sparse" cognition bias, then the only options available to the system for presenting subsequent sets of data are those data display formats shown under the "hierarchical", "visual", and "sparse" headings in lookup table 500 in FIG. 5. Thus, the system cannot display data in a "database" or "searchable cloud" data display format, since these are not options under the "hierarchical", "visual", and "sparse" headings.

In one embodiment of the present invention, a file taxonomy is used to compare different data display formats. For example, consider the graph 700 depicted in FIG. 7, which illustrates a file taxonomy for a user-selected data display format. Assume that node 702 represents traits of the user-selected data display format selected by a user (e.g., by clicking the button 204 in FIG. 2). One or more other data display formats are related to this user-selected data display format, as represented by nodes 704, 706, and 708 in FIG. 7. For example, assume that the user-selected data display format (i.e., a "tree" data display format) has three equal qualities, shown as quality 1.000, 2.000, and 3.000. For example, three such equal qualities may be the data display format's use of a hierarchical structure (1.000), English text (2.000), and connector lines (3.000). The other data display format represented by node 704 is 100% hierarchical (1.000), but does not use English text (2.000) or connector lines (3.000). Similarly, the data display format represented by node 706 is 100% in its use of English text (2.000), but is not hierarchical (1.000) and does not use connector lines (3.000). Likewise, the data display format represented by node 708 is 100% in its use of connector lines (3.000) but is not hierarchical (1.000) and does not use English text (2.000).

Thus, graph 700 displays the users' organization of files and various data display formats. In one embodiment, a Singular Value Decomposition (SVD) is used to summarize files and their data display formats, in order to compare/contrast various data display formats.

An SVD utilizes a factorization of a matrix, thus providing a statistical analysis of how closely different nodes (and their respective data display formats) are related. Assume that the SVD is used to compare the (1×3) matrixes depicted in nodes 704, 706, and 708 to the (1×3) matrix depicted in node 702. That is, each of the nodes 702, 704, 706, and 708 has a 1×3 matrix for the percentage of the three parameters (1.000, 2.000, 3.000) described above. Thus, the SVD of this m×n (1×3) matrix M in the node 702 is a factorization of the form M=UΣV*, where U is a m×m real unitary matrix (derived by the cross product of two copies of the same 1×3 matrix in the node 702), Σ is an m×n rectangular diagonal matrix (in which all entries other than those in the diagonal of the 1×3 matrix shown in node 702 are zero), and V* is a transpose (rotated about the transverse axis) of a n×n matrix V (for the combined three nodes 704, 706, and 708).

While the present invention has been described herein as the user selecting which organization format he/she prefers, in one embodiment this user selection is augmented by readings from sensors (e.g., sensors 154 depicted in FIG. 1). That is, while in one embodiment, the user selects the preferred data organization format simply based on his/her chosen preference, in another embodiment the selected data organization format is from a set of choices that are set by the sensors. In this embodiment, the sensors will establish which data organization formats are made available to the user, with the user then choosing from these available formats.

Alternatively, the choice of which data organization format is used is set by readings from the sensors, which are analyzed by the system (e.g., using DOFPDP 148 in FIG. 1). That is, in this embodiment, the user is not allowed to choose which data organization format is used, but rather the data organization format is pre-established by readings from the sensors. The user is then allowed to accept, decline, and/or change the sensor-established data organization format. Similarly, the sensor-established data organization format may override the data organization format that was previously chosen by the user. The following embodiments may be utilized in either embodiment (i.e., in which the selection of the data organization format by the user is augmented by the sensor readings, or in which the selection of the organization format is set/overridden by the analysis of the sensor readings).

Thus, in one embodiment of the present invention, assume that sensors 154 are physiological sensors (e.g., electrocardiogram sensors, electroencephalogram sensors, blood pressure sensors, etc.) that are attached to a user who will be viewing and/or otherwise using a set of data. If the physiological sensors detect that the user is in a highly agitated state (e.g., an astronaut during blastoff or a naval aviator during a nighttime carrier landing), then the system will adjust the organization format accordingly. For example, a predetermination can be made (based on human perception studies) that a person in this state is better able to read/interpret/understand data that is in a visual format (e.g., a color-coded bar graph) rather than a detailed table, tree format, etc. If the data is initially being displayed as a table, then, according to the determination that the user is in a highly agitated state, the system (e.g., computer 102) will change the organization format of the data being displayed from that which supports the display of table to that which supports a bar graph. In one embodiment, once the person is no longer in the highly agitated state (as determined by an analysis of readings from the physiological sensors), the data organization and display thereof will return to the table format, in which more detailed information can be presented.

In another embodiment of the present invention, the selected organization format is based on readings from position sensors (e.g., GPS tracking devices). For example, assume that readings from engine sensors on a motor vehicle (car, truck, bus, etc.) show that the engine is overheating. If the motor vehicle is on a rural area where traffic is known to be light (e.g., based on historical data or real-time traffic information via a traffic service), then the sensor data describing the engine overheating will be displayed on a default digital/analog display (e.g., a gauge display). However, if the motor vehicle is in a highly congested urban area (again, based on historical data or real-time traffic information from a traffic service), then the organization format of the data may be transformed to a different format, such as a simple color-coded visual symbol (e.g., depicting a hot engine). This prevents the driver from trying to interpret detailed data about the engine while negotiating heavy traffic. Similarly, if the GPS-enabled device is an aircraft, then different types of data will be displayed when the aircraft is in an area known to require little attention by the pilot (e.g., while at cruising altitude) than when much is being demanded of the pilot (e.g., during landing, in a combat zone, etc.)

In another embodiment of the present invention, the selected organization format is based on readings from weather sensors (e.g., barometers, weather radar, thermometers, etc.) at a location of the user. For example, assume that the user is reading data (from sensors or from a database) on a laptop that is outside. Initially, assume that the weather sensors provide readings indicative of weather that is sunny and clear. In this scenario, the optimal organization of the data (and display thereof) may be a large pie chart, which is easy to see on the laptop in a sunny environment. If the sensors detect that the weather has become cloudy, and thus the sky is darker, then a more detailed table/tree organization of the data may be presented.

Besides determining the optimal viewing format for the user, a change in the weather may also cause a change in the organization format based on what data is needed by the user. For example, if the weather sensors indicate that the weather is clear and calm, then a data organization format of the weather data may include a simple delineation of the data as being clear/calm, stormy, etc. However, if the weather turns severe (e.g., a tornado pops up), then the organization format of the data may be transformed from this simple format (clear, stormy, etc.) to a more detailed format (e.g., wind speed, wind direction, etc.), as such detailed information is likely needed by the user.

Figure 8:
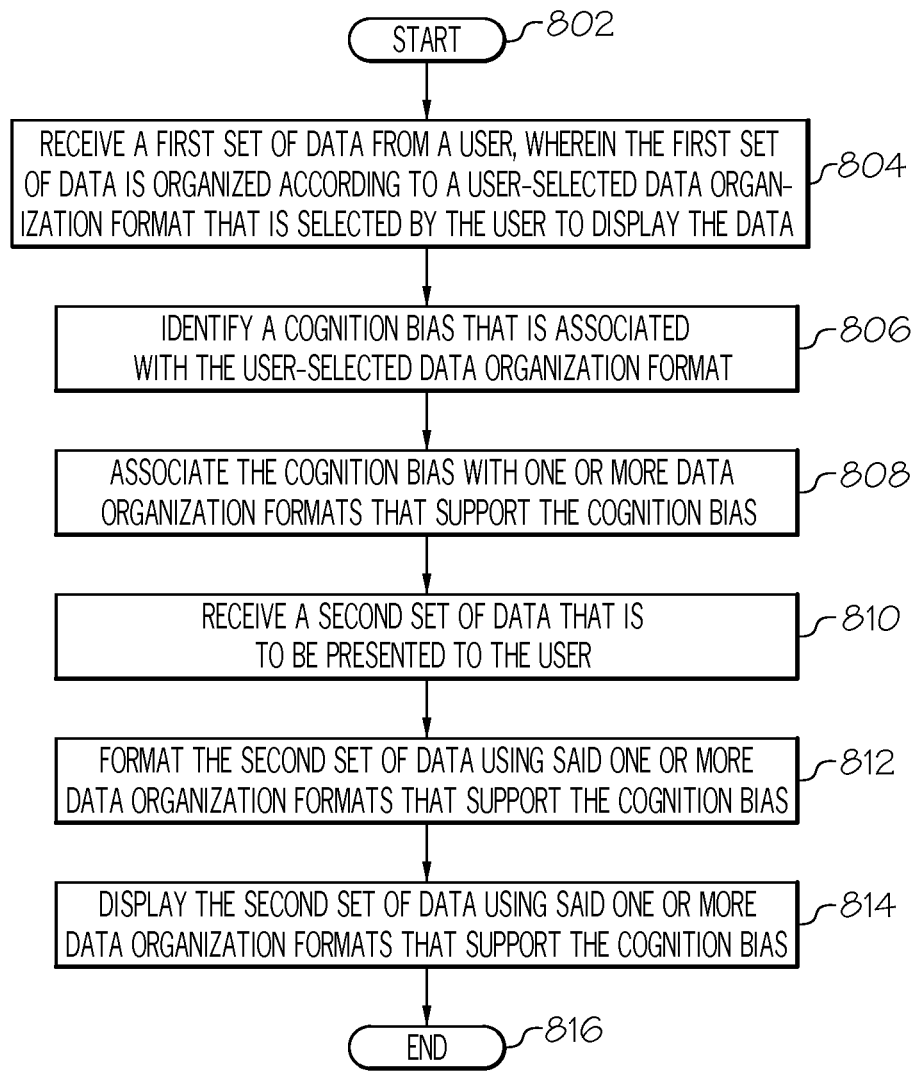
FIG. 8 is a high-level flowchart of one or more steps performed by one or more processors to identify a heuristic/cognition bias of a user in order to organize future sets of data for display.

With reference now to FIG. 8, a high-level flowchart of one or more steps performed by one or more processors to identify a heuristic/cognition bias of a user in order to organize future sets of data for display is presented. That is, FIG. 8 presents a method of establishing a format for displaying data to a specific user. After initiator block 802, a first set of data is received from a user (block 804). This first set of data is organized according to a user-selected format that is selected by the user to display the data (see FIG. 2).

As described in block 806, a cognition bias that is associated with the user-selected organization format is then identified (see FIG. 4). This cognition bias defines a preferred manner in which the user cognitively interprets data.

As described in block 808, the cognition bias is then associated with one or more data formats that support the cognition bias (see FIG. 5).

As described in block 810, a second set of data that is to be presented to the user is then received. This second set of data is then formatted/reformatted using one or more data formats that support the cognition bias of the user who receives the second set of data (block 812). The newly-formatted second set of data (see FIG. 6) is then displayed, such that the second set of data uses one or more data formats that support the cognition bias of the user (block 814). The process ends at terminator block 816.

Figure 7:
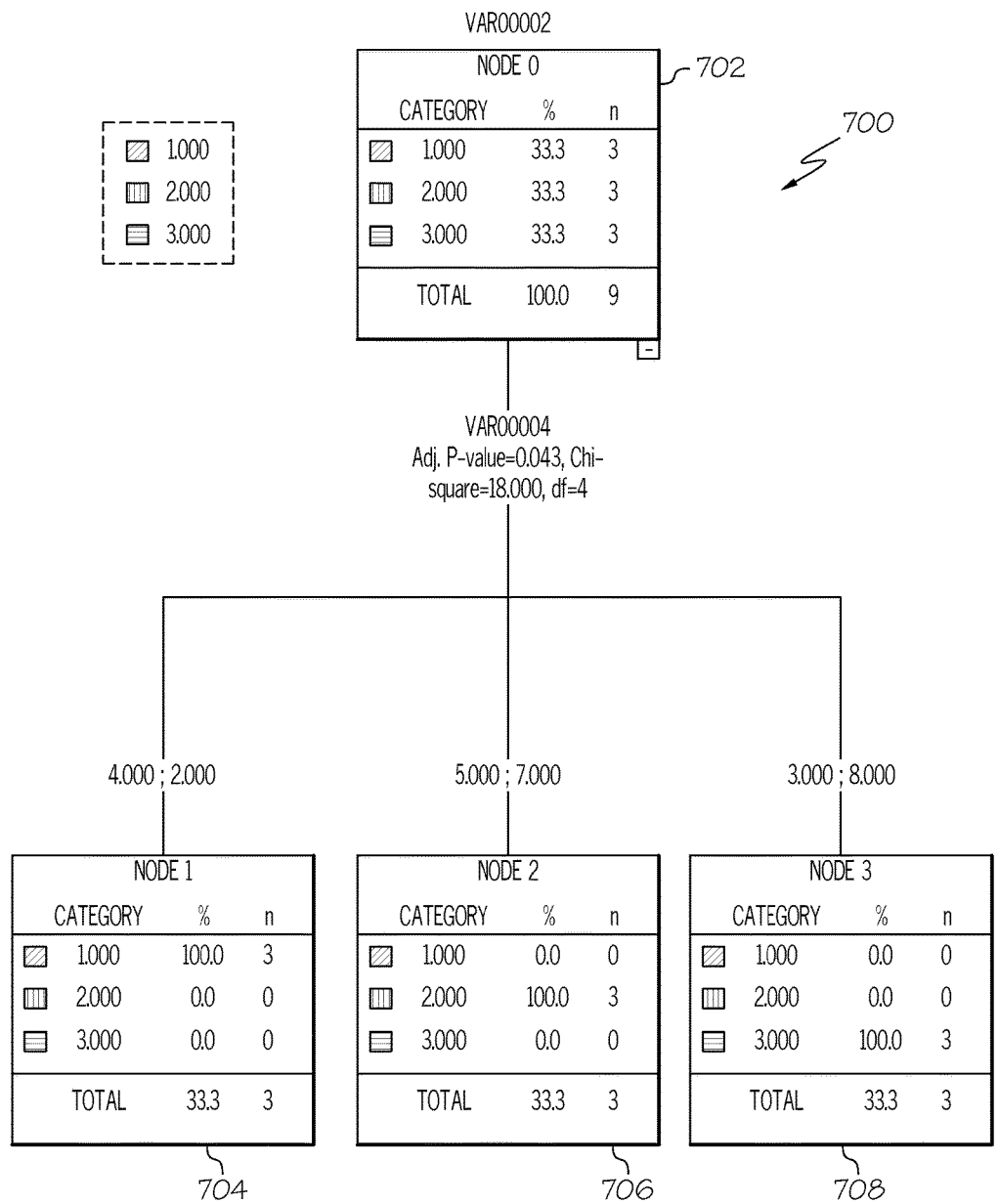
FIG. 7 illustrates a file taxonomy for a user-selected format.

In one embodiment of the present invention, the method further comprises generating a file taxonomy (see FIG. 7). This file taxonomy describes a relationship between data nodes in the first set of data when displayed in the user-selected organization format. One or more processors then organize the second set of data by applying the file taxonomy of the user-selected organization format to the one or more data formats that support the cognition bias. The file taxonomy may also consist of a set of clustering parameters, such as initial positions of nodes in a Kohonen Map, which may be related to a user's cognitive bias, then introduced as a bias in the subsequent self-organization of clusters of the second set of data.

In one embodiment of the present invention, the method further comprises identifying, by one or more processors, the cognition bias that is associated with the user-selected organization format from a lookup table that matches a particular cognition bias to a particular heuristic rule, wherein the particular heuristic rule identifies traits that are associated with the particular cognition bias. That is, assume that one of the cognition biases 404 shown in FIG. 4 are based on a heuristic rule (i.e., a rule that a person follows to form a judgment, make a decision, interpret data, etc.) being followed. Thus, besides using the table in FIG. 4 to identify a particular cognition bias for a person, this cognition bias can be further identified and/or refined by determining whether or not that person obeys a particular heuristic rule in his evaluation processes. This determination as to whether the person obeys this particular heuristic rule or not can be determined by his/her answers to a questionnaire, his/her history of preferred websites, etc.

In one embodiment of the present invention, the first set of data is of a first type of data and the second set of data is of a second type of data. For example, the first set of data presented in FIG. 3 is a set of folders and files in a structured directory. However, the second set of data presented in FIG. 4 is a set of descriptive nodes that describe persons involved in a movie project. Similarly, the first set of data could be text files, while the second set of data could be video files.

In one embodiment of the present invention, the user-selected format and the one or more data formats that support the cognition bias are structurally different data formats. For example, the user-selected format used in FIG. 3 is a hierarchical tree data display format, while that used in FIG. 6 is an organizational chart format.

In one embodiment of the present invention, the user-selected format presents data at a different level of granularity than the one or more data formats that support the cognition bias. For example, the first set of data may be presented in a highly granular format (e.g., a relational database), while the second set of data may be presented in a less granular format (e.g., a tree graph). Again, note that the present invention does not merely use a format that the user has indicated that he/she prefers when viewing data, but rather the selected format is based on that user's determined cognition bias.

In one embodiment of the present invention, the method further comprises selecting, by one or more processors, one or more data formats from a group of data formats that have been predetermined to support the cognition bias (see FIG. 5).

As described herein, in one embodiment a user's preferred information presentation and organization style is determined based on how they organize files and content within the operating system. The predicted preferred style is a bias introduced into a multidimensional space of new content when it undergoes an order embedding (dimensionality reduction) to produce an organizational scheme for presentation of the new information. The analysis allows the user/system to determine and produce the bias for a particular structure for data to be organized and displayed by this embedding. This presents a new and novel solution to the problem of presenting new sets of data to a person in a way that is intuitive to them. That is, different people organize data in different ways in their mind. Some users use data in a hierarchical tree, others tabular, others keyword based, etc. Subsequently the way users prefer data to be displayed (search results, images, documents, etc., web content) can be determined and predictively displayed through use of the present invention.

In one embodiment of the present invention, by parameterizing an order embedding algorithm, a user's preferred organization for content and files is produced and stored on their computer. This enables the present system to discover a model for their bias in organizing and representing new information according to certain predefined parameters. These parameters are then applied to new content, files, and information in order to use the way a person interacts with data in one context to change the way we present data to the user in another context.

In one or more embodiments, inputs into the system (i.e., the user-selected data display format) include, but are not limited to, file system organizers, apps in smart phones, other information organized by a user, and their organizational structure. Transformations are the parameters of an order embedding algorithm that match user content to their preferred organizational scheme. Outputs are information presented using this order embedding algorithm and the discovered parameters to condition presentation, deep QA qualities and methods of answering (e.g., esoteric organization vs. precise).

Thus, in one embodiment of the present invention, an analysis is made of user data (i.e. file system) to determine its structure/display format. A determination is made of a predominant pattern of users' cognition bias through an analysis of file organization from one or more predetermined categories (i.e., tree, tabular, keyword based), using a parameterization of an order embedding algorithm. The presentation of new data provided to the user is then adjusted to fit their predominant pattern (i.e., through stylesheet modification or javascript modification etc.) based on embedding new information with the same embedding algorithm and parameters.

Thus, the presently presented invention organizes user-provided data based on a user's cognition bias for data presentation, as determined by file system analysis and an order embedding algorithm. This permits the selective modification of data, including that found in a website presentation, based on a user's cognition bias for data presentation, as determined by the file system analysis.

Note that the present invention does not merely identify a data display format that a user prefers, and then apply that format to all incoming sets of data. Rather, the present invention as described and claimed first identifies a cognition bias based on a user-selected data display format. This cognition bias is then used to select one or more data display formats that are selectively used by different types of incoming data.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of establishing a data organization format for displaying data to a specific user, the method comprising:
   receiving, by one or more processors, a first set of data from a user, wherein the first set of data is organized according to a user-selected data organization format that is selected by the user;
   identifying, by one or more processors, a cognition bias that is associated with the user-selected data organization format, wherein the cognition bias defines a preferred manner in which the user cognitively interprets data;
   associating, by one or more processors, the cognition bias with one or more data organization formats that support the cognition bias;
   receiving, by one or more processors, a second set of data that is to be presented to the user;
   formatting, by one or more processors, the second set of data using said one or more data organization formats that support the cognition bias; and
   displaying, by one or more processors, the second set of data using said one or more data organization formats that support the cognition bias.

2. The method of claim 1, further comprising:
   generating, by one or more processors, a file taxonomy, wherein the file taxonomy describes a relationship between data nodes in the first set of data when displayed in the user-selected data organization format; and
   organizing, by one or more processors, the second set of data by applying the file taxonomy of the user-selected data organization format to the one or more data organization formats that support the cognition bias.

3. The method of claim 1, further comprising:
   identifying, by one or more processors, the cognition bias that is associated with the user-selected data organization format from a lookup table, wherein the lookup table matches a particular cognition bias to a particular heuristic rule, wherein the particular heuristic rule identifies traits that are associated with the particular cognition bias.

4. The method of claim 1, wherein the first set of data is of a first type of data and the second set of data is of a second type of data.

5. The method of claim 1, wherein the user-selected data organization format and the one or more data organization formats that support the cognition bias are structurally different data organization formats, and wherein the user-selected data organization format and the one or more data organization formats support a same cognition bias.

6. The method of claim 1, wherein the user-selected data organization format presents data at a different level of granularity than the one or more data organization formats that support the cognition bias.

7. The method of claim 1, further comprising:
   selecting, by one or more processors, the one or more data organization formats from a group of data organization formats that have been predetermined to support the cognition bias.

8. The method of claim 1, further comprising:
   identifying, by one or more processors, the cognition bias that is associated with the user-selected data organization format according to sensor readings from a physiological sensor that is monitoring the user; and
   modifying, by one or more processors, how the second set of data is displayed based on the sensor readings from the physiological sensor.

9. The method of claim 1, further comprising:
   identifying, by one or more processors, the cognition bias that is associated with the user-selected data organization format according to sensor readings from a physical sensor that is monitoring a physical device; and
   modifying, by one or more processors, how the second set of data is displayed on the physical device based on the sensor readings from the physical sensor that is monitoring the physical device.

10. The method of claim 1, further comprising:
    identifying, by one or more processors, current weather conditions for a location of a display on which the second set of data is displayed; and
    modifying, by one or more processors, how the second set of data is displayed on the display based on the current weather conditions.

11. The method of claim 1, wherein the second set of data is displayed on a display that is outdoors, and wherein the method further comprises:
    identifying, by one or more processors, current lighting conditions caused by current weather conditions for a location of display; and
    modifying, by one or more processors, how the second set of data is displayed on the display based on the current lighting conditions.

12. The method of claim 1, wherein the second set of data is displayed on a display within a vehicle, and wherein the method further comprises:
    identifying, by one or more processors, the cognition bias that is associated with the user-selected data organization format according to sensor readings from a physical sensor that identifies current traffic conditions for the vehicle; and
    modifying, by one or more processors, how the second set of data is displayed on the display within the vehicle based on the current traffic conditions for the vehicle.

13. A computer program product for establishing a data organization format for displaying data to a specific user, the computer program product comprising a computer readable storage medium having program code embodied therewith, the program code readable and executable by a processor to perform a method comprising:

receiving, by one or more processors, a user-selected data organization format;

identifying a cognition bias that is associated with the user-selected data organization format, wherein the cognition bias defines a preferred manner in which the user cognitively interprets data;

associating the cognition bias with one or more data organization formats that support the cognition bias;

receiving a first set of data that is to be presented to the user;

formatting the first set of data using said one or more data organization formats that support the cognition bias; and displaying the first set of data using said one or more data organization formats that support the cognition bias.

14. The computer program product of claim 13, wherein the method further comprises:

generating a file taxonomy, wherein the file taxonomy describes a relationship between data nodes in the first set of data when displayed in the user-selected data organization format;

receiving a second set of data that is to be presented to the user; and organizing the second set of data by applying the file taxonomy of the user-selected data organization format to the one or more data organization formats that support the cognition bias.

15. The computer program product of claim 13, wherein the method further comprises:

identifying the cognition bias that is associated with the user-selected data organization format from a lookup table, wherein the lookup table matches a particular cognition bias to a particular heuristic rule, wherein the particular heuristic rule identifies traits that are associated with the particular cognition bias.

16. The computer program product of claim 13, wherein the first set of data is of a first type of data and the second set of data is of a second type of data.

17. The computer program product of claim 13, wherein the method further comprises:

selecting the one or more data organization formats from a group of data organization formats that have been predetermined to support the cognition bias.

18. A computer system comprising:

a processor, a computer readable memory, and a computer readable storage medium;

first program instructions to receive a first set of data from a user, wherein the first set of data is organized according to a user-selected data organization format that is selected by the user;

second program instructions to identify a cognition bias that is associated with the user-selected organization format, wherein the cognition bias defines a preferred manner in which the user cognitively interprets data;

third program instructions to associate the cognition bias with one or more data organization formats that support the cognition bias;

fourth program instructions to receive a second set of data that is to be presented to the user;

fifth program instructions to format the second set of data using said one or more data organization formats that support the cognition bias; and sixth program instructions to display the second set of data using said one or more data organization formats that support the cognition bias; and wherein the first, second, third, fourth, fifth, and sixth program instructions are stored on the computer readable storage medium and executed by the processor via the computer readable memory.

19. The computer system of claim 18, further comprising:

seventh program instructions to generate a file taxonomy, wherein the file taxonomy describes a relationship between data nodes in the first set of data when displayed in the user-selected data organization format; and eighth program instructions to organize the second set of data by applying the file taxonomy of the user-selected data organization format to the one or more data organization formats that support the cognition bias; and wherein the seventh and eighth program instructions are stored on the computer readable storage medium and executed by the processor via the computer readable memory.

20. The computer system of claim 18, further comprising:

seventh program instructions to identify the cognition bias that is associated with the user-selected data organization format from a lookup table, wherein the lookup table matches a particular cognition bias to a particular heuristic rule, wherein the particular heuristic rule identifies traits that are associated with the particular cognition bias; and wherein the seventh program instructions are stored on the computer readable storage medium and executed by the processor via the computer readable memory.

* * * * *